United States Patent Office 3,113,676
Patented Dec. 10, 1963

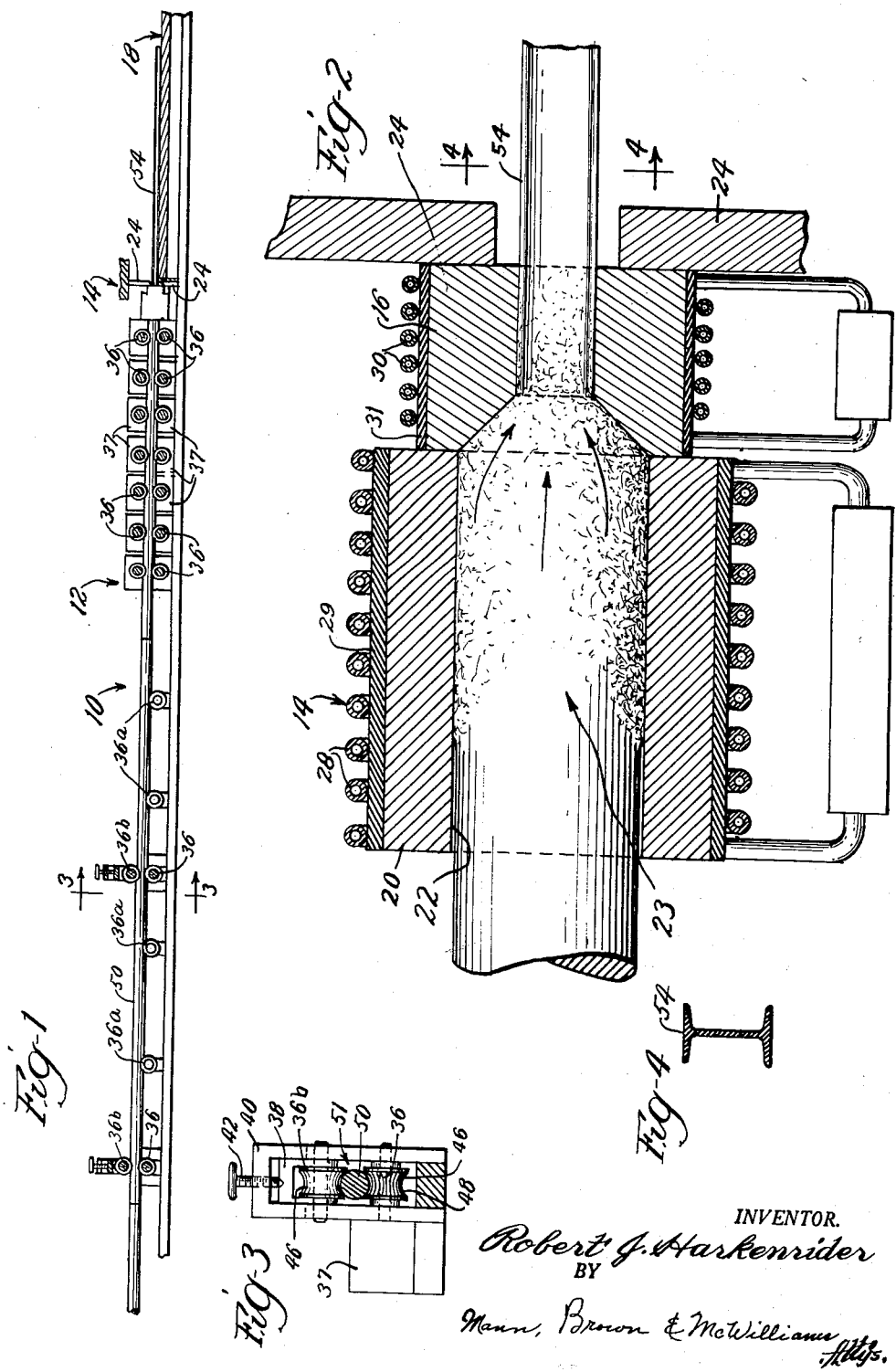

3,113,676
APPARATUS FOR CONTINUOUS EXTRUSION OF METAL
Robert J. Harkenrider, 63 W. Broadway, Winona, Minn.
Continuation of abandoned application Ser. No. 560,983, Jan. 24, 1956. This application July 20, 1959, Ser. No. 829,954
2 Claims. (Cl. 207—2)

My invention relates to apparatus for continuous extrusion of metal, and more particularly, to apparatus for continually extruding metal billets or ingots into useful extruded shapes.

Extrusion of metal heretofore has been confined to processes and apparatus that inherently cannot provide continuous extrusion. Mechanical and hydraulic ram-type presses are conventionally used in this art, the machine employing the direct, inverted, or impact method of extrusion. The extrusion provided by these machines is not continuous since the ram must be withdrawn after each power stroke to place a new billet or ingot in the compression chamber of the machine.

Contrary to this accepted practice, I propose to provide an entirely new manner of extrusion that is inherently continuous.

The principal object of the invention is to provide apparatus for continuous extrusion of metal.

A further object of the invention is to provide a ramless metal extruding machine through which metal billets or ingots may be extruded in a continual stream.

Still a further object of the invention is to provide a simplified form of extruding machine capable of higher productive results than was heretofore thought possible.

A further object of the invention is to provide apparatus for extruding metals in which the extrusion is continual and unbroken during the production operation.

Other objects, uses, and advantages will be obvious or become apparent from a consideration of the following description and drawings.

In the drawings:
FIGURE 1 is a diagrammatic side elevational view of one form of apparatus embodying my invention;
FIGURE 2 is a diagrammatic longitudinal cross-sectional view through the extruder cylinder and die plate employed in the apparatus shown in FIGURE 1;
FIGURE 3 is a cross-sectional view along line 3—3 of FIGURE 1; and
FIGURE 4 is a cross-sectional view along line 4—4 of FIGURE 2.

Reference numeral 10 of FIGURE 1 generally indicates one form of apparatus in which the principles of my invention are embodied and which is particularly adapted for extruding aluminum. The apparatus or machine 10 comprises a bed 12 of rollers, an extrusion cylinder 14, a die plate 16 (see FIGURE 2), and a run-out table 18.

The extrusion cylinder 14 (see FIGURE 2) comprises a cylinder 20 formed with an axially extending bore 22. The cylinder 20 is supported in any suitable manner upstream of die plate 16 mounted on any suitable support. Die plate 16 may abut suitable abutments 24. The die plate is formed with any desired extruding opening or passage, such as the passage that will produce the standard commercial beam configuration shown in FIGURE 4. The bore of cylinder 20 and the die plate define a compression chamber 23 adapted to receive the material to be extruded, as hereinafter described.

In the illustrated embodiment, the cylinder 20 is heated by an induction coil 28 secured about the cylinder 20, and the die plate 16 is heated by a separate induction coil 30 positioned thereabout. Coils 28 and 30, respectively, are separated from the cylinder 20 and die plate 16 by insulating sleeves 29 and 31 of suitable insulating material. These sleeves also provide thermal insulation for the cylinder and die plate, respectively. Preferably the induction coils 28 and 30 are separately controlled to provide a heat differential where and when needed, as hereinafter made clear. The ends of the coils are connected to a suitable source of A.C. power.

The roller bed 12, in the illustrated embodiment, is mounted adjacent the left hand end of cylinder 20. The roller bed 12 comprises an upper and lower series of rollers 36 each independently driven through some form of slip coupling means in which the torque that is applied to the individual rollers may be adjusted to suit conditions. In the illustrated embodiment of the invention the rollers 36, which are only diagrammatically illustrated, are driven by rotary type hydro-motors 37, such as those manufactured by Vickers, of Detroit, Michigan. Adjacent the extrusion cylinder 14, the rollers 36 of both the upper and lower series rollers are all independently driven, but at points spaced from the extrusion cylinder 14, some rollers 36a may be idler rollers, while some rollers 36b of the upper series of rollers may be pressure idler rollers. The pressure rollers 36b shown are each mounted in U-shaped yokes 38 slidably mounted in U-shaped frames 40 that support both the pressure rollers and the rollers that they cooperate with. A screw-threaded handle 42 suitably mounted or secured to the yoke 38 may be provided to move the roller 36b toward and away from driven roller 36.

As seen in FIGURE 3, in the illustrated embodiment, the rollers 36, 36a and 36b are formed with concave surfaces 46 which may be knurled as at 48. The surfaces 46 are complementary to the surfaces of rounded billets 50 of aluminum that are to be extruded by the machine 10. In the illustrated embodiment, billets 50 are approximately 10 feet long and approximately two inches in diameter, though billets of other lengths and diameters may be employed as the particular apparatus set up and nature of the material to be extruded dictate or render desirable.

As indicated in FIGURE 3 and also FIGURE 1, the upper and lower series of rollers comprising the roller bed 12 are mounted for rotation about axes that extend transversely of the central axis of cylinder bore 22 and define an elongate rectilinear passageway 51 that leads to the bore 22 of cylinder 20. The rollers of the roller bed are spaced to maintain the necessary rectilinear movement of the billets, as indicated in FIGURE 1. In the illustrated embodiment the last three feet of the roller bed 12 should be powered to do the really hard pushing.

In accordance with the present invention, in starting production the rollers 36 are rotated and the cylinder 14 and die plate 16 are heated by electrically connecting coils 28 and 30 to the source of A.C. power. After the cylinder 20 and die plate 16 have reached appropriate temperatures, the elongate billets, ingots, or stocks 50 are started through the machine 10 by inserting the first billet or ingot 50 into the passageway 51 defined by the rollers 36. The powered rollers 36 grip the first billet or ingot 50 and move its leading end into the cylinder 20 and against die plate 16. After the first billet is pressed against the die plate 16, the rollers 36 are preferably powered to rotate at a speed that is somewhat greater than that required to move the head of the billet 50 into the die plate passage or opening after it is plasticized so that it is pressed against the die plate 16 with considerable force. As soon as the leading billet 50 disappears into the passageway defined by the rollers, other billets or ingots 50 are immediately inuserted into the passageway behind the leading billet, and the powered rollers 36 press the following billets against the leading ones.

The heat and pressure acting on the billet portion forming the leading end or head of the lead billet 50 will plasticize this end sufficiently so that the action of the rollers on the outwardly extending end of the billet forces the plasticized end of the billet into and through hte extrudnig passages of the die plate 16. As the first billet nears exhaustion, the following billet enters the cylinder 20, and as the latter's leading end plasticizes, it merges with the plasticized trailing end of the first billet. This process continues throughout the extruding process, with the result that continuous extrusion is provided.

Once the extruding step has commenced, the column or series of ingots 50 are forced through the die plate 16 in a continual stream until the supply of billets 50 is used up or it is desired to cease production. The extruded material 54 moves out on the run-out table 18 for appropriate handling in accordance with known principles in the art.

The controls for the coils 28 and 30 may be actuated to heat the cylinder 20 and die plate 16 as required to sufficiently plasticize the material passing through these elements.

The cylinder 20 and die plate 16 may be heated in a number of ways. Besides the induction heating method employed on the illustrated apparatus, the cylinder and die plate may be heated through or by electrical resistance or by gas burners mounted about the exterior thereof. Induction heating is preferred, however, and I prefer to select the material of the cylinder 20, the die plate 16, and the material to be extruded so that the magnetic lines of force pass through the billet and so the eddy currents in the cylinder and die plate will not be too great, thus heating the billet apart from the cylinder and die plate. That is, the billets would be heated other than by heat being supplied by conduction from the cylinder 20 and die plate 16, respectively. This is in accordance with the principles described in my Patent No. 2,875,311, granted February 24, 1959, though in the illustrated embodiment since aluminum is non-magnetic, the cylinder 20 and die plate 16 must be formed from a substance that is sufficiently impermeable to magnetism to cause the lines of force to travel through the aluminum substantially to the exclusion of the cylinder and die plate and yet must not provide an absolute shield that would interrupt the path to the aluminum, such as a steel alloy containing twenty-five percent nickel. If desired, a permeable insert may be interposed between the cylinder 20 and die plate 16.

It is to be understood that the drawing merely schematically illustrates one embodiment of the invention, and that in practice the coils 28 and 30, the cylinder 20 and die plate 16 are to be arranged in accordance with known practice modified, of course, by the teachings of this application.

While the illustrated apparatus is designed to extrude aluminum or aluminum alloy billets or ingots, I contemplate that my illustrated invention may be applied to metal such as lead, tin, copper, magnesium, zinc, and their respective alloys. If induction heating of the type indicated above is applied, the material of the cylinder and die plate should vary accordingly.

This application is a continuation of my application Serial No. 560,983, filed January 24, 1956, and now abandoned.

The foregoing description and the drawings are given merely to explain and illustrate my invention, and the manner in which it may be performed, and the invention is not to be limited thereto, except insofar as the appended claims are so limited, since those skilled in the art who have my disclosure before them will be able to make modifications and variations therein without departing from the scope of the invention.

I claim:
1. Apparatus for making possible the continuous extrusion of solid elongate metal billets into standard commercial shapes when the billets are advanced toward the apparatus in end to end tandem arrangement, said apparatus comprising a rigid tubular cylinder, a hardened die plate positioned in abutting relation with one end of said cylinder and formed with an extruding passage in alignment with the bore of said cylinder, said passage defining a standard commercial shape, said die plate and said bore of said cylinder defining a compression chamber, means for fixedly mounting said cylinder and said die plate, a roller bed positioned adjacent the other end of said cylinder and in alignment with said bore, said roller bed comprising spaced pairs of diametrically opposed rollers journalled for rotation about axes extending transversely of the axis of said cylinder bore and spaced laterally of said bore axis, said rollers defining a rectilinear billet feed passage in alignment with said bore, with a plurality of said pairs of rollers being arranged in closely spaced relation adjacent said other end of said cylinder, said rollers of each pair of rollers being positioned to tractionally engage the individual billets when the latter are placed in said feed passage, means for continuously driving said closely spaced rollers and at least one roller of each of the remaining pairs of rollers in a direction to force the billets in a series in end to end tandem relation toward said bore of said cylinder whereby the billets become a continuous ram for forcing the leading end of the series of billets into and through said compression chamber, said remaining rollers being spaced to maintain the rectilinear movement of the billets, and means for heating by induction the billet portion passing through said chamber the amount required, as related to the pressure acting on said billet portion due to the driving action of said rollers on the billets, to sufficiently plasticize said billet portion to effect a continuous extrusion of the billets through said die plate extruding passage.

2. The apparatus set forth in claim 1 adapted for extruding aluminum billets wherein said cylinder is formed from a substance that is sufficiently impermeable to magnetism to cause the lines of force generated by said heating means to travel through the billet portion substantially to the exclusion of said cylinder.

References Cited in the file of this patent
UNITED STATES PATENTS

| | | |
|---|---|---|
| 604,137 | Bishop | May 17, 1898 |
| 1,350,307 | Fullbright | Aug. 24, 1920 |
| 2,075,622 | Nehlsen | Mar. 30, 1937 |
| 2,225,424 | Schwarzkopf | Dec. 17, 1940 |
| 2,290,734 | Brassert | July 21, 1942 |
| 2,476,830 | Spencer | July 19, 1949 |

FOREIGN PATENTS

| | | |
|---|---|---|
| 852,832 | Germany | Oct. 20, 1952 |